(12) United States Patent
Churcher et al.

(10) Patent No.: US 10,155,887 B2
(45) Date of Patent: Dec. 18, 2018

(54) TWO COMPONENT SPRAYABLE ADHESIVE ADDITIVE AND METHOD OF USE

(71) Applicants: Ian L. Churcher, Richmond, VA (US); Steven E. Adams, Richmond, VA (US)

(72) Inventors: Ian L. Churcher, Richmond, VA (US); Steven E. Adams, Richmond, VA (US)

(73) Assignee: Worthen Industries, Nashua, NH (US)

( * ) Notice: Subject to any disclaimer, the term of this patent is extended or adjusted under 35 U.S.C. 154(b) by 254 days.

(21) Appl. No.: 15/133,881

(22) Filed: Apr. 20, 2016

(65) Prior Publication Data

US 2016/0312078 A1  Oct. 27, 2016

Related U.S. Application Data

(60) Provisional application No. 62/150,449, filed on Apr. 21, 2015.

(51) Int. Cl.
| | | |
|---|---|---|
| *C09J 9/00* | (2006.01) | |
| *C09J 11/06* | (2006.01) | |
| *C09J 11/04* | (2006.01) | |
| *B05B 7/08* | (2006.01) | |
| *C08K 5/00* | (2006.01) | |

(52) U.S. Cl.
CPC .............. *C09J 9/00* (2013.01); *B05B 7/0846* (2013.01); *C09J 11/04* (2013.01); *C09J 11/06* (2013.01); *C08K 5/0041* (2013.01)

(58) Field of Classification Search
CPC ............... C09J 9/00; C09J 11/04; C09J 11/06
See application file for complete search history.

(56) References Cited

U.S. PATENT DOCUMENTS

| | | | |
|---|---|---|---|
| 4,695,618 A | | 9/1987 | Mowrer |
| 5,733,961 A | | 3/1998 | Purvis |
| 6,518,356 B1 | * | 2/2003 | Friese .................. C08G 18/672 |
| | | | 524/580 |
| 6,533,187 B2 | | 3/2003 | May |
| 7,216,816 B2 | | 5/2007 | Hammarth |
| 8,118,969 B2 | | 2/2012 | Williams |
| 2004/0014875 A1 | * | 1/2004 | Russo ....................... B44C 7/04 |
| | | | 524/557 |
| 2006/0069196 A1 | | 3/2006 | Grabowski |
| 2007/0224395 A1 | | 9/2007 | Rowitsch |
| 2007/0272768 A1 | | 11/2007 | Williams |

FOREIGN PATENT DOCUMENTS

| | | |
|---|---|---|
| EP | 0814139 | 12/1997 |
| WO | 2014182170 | 11/2014 |
| WO | 2015137808 | 9/2015 |

* cited by examiner

*Primary Examiner* — Edward J Cain

(74) *Attorney, Agent, or Firm* — Lambert Shortell & Connaughton; Gary E. Lambert; David J. Connaughton, Jr.

(57) ABSTRACT

A two component sprayable adhesive and system for spraying is provided. The two component adhesive may have an adhesive, and an activator. These components are mixed after spraying, either in the air or on a substrate. The activator destabilizes the adhesive making it more tacky and effective. In at least one of the two components, an additive is provided to provide a visual indication that the components are mixed and/or properly mixed in the intended ratio.

20 Claims, 2 Drawing Sheets

TWO COMPONENT SPRAYABLE ADHESIVE ADDITIVE AND METHOD OF USE

BACKGROUND OF THE INVENTION

Field of the Invention

The present invention relates generally to two component sprayable adhesive systems, whether air-atomized or airless. More particularly, the present invention relates to a two component sprayed adhesive system that includes an additive in one of the components to visually, optically, or otherwise indicate that the two components are being properly combined during use.

Description of Related Art

With typical two component adhesive spray systems, a base adhesive and activator are sprayed together to mix either in the air before a surface and/or on the surface receiving the adhesive. The activator mixing with the adhesive is an important part of the adhesion process because in many cases without the activator mixing, the adhesive will not work, or at best will take a longer than desirable time to be adherent. Thus, it is important that proper amounts of both adhesive and activator is sprayed on a surface in two component sprayed adhesive applications.

However, in many cases, an issue causing an improper mixture of adhesive and activator such as one of the nozzles of the two component spray system (adhesive nozzle, or activator nozzle) clogging, either fully or partially, may occur. In particular, it is known that the activator may clog more readily than the adhesive. This can lead to failure of adhesive applications. In such a case, it may further be difficult to impossible for an operator to tell that one of the nozzles are clogged because visually, if some fluid is being applied to the adhesive receiving surface, it is difficult to tell which fluid and in what amounts.

Therefore, what is needed is a two component adhesive spray system capable of providing a visual indication of if an adequate amount of both sprayed components are being applied to the surface on which the adhesive is being sprayed.

SUMMARY OF THE INVENTION

The subject matter of this application may involve, in some cases, interrelated products, alternative solutions to a particular problem, and/or a plurality of different uses of a single system or article.

In one aspect, a two component adhesive spraying system is provided. The spray system utilizes a unique two component composition comprising a first adhesive component that can be sprayed from a first nozzle of the spray system. The composition further comprises a second activator component that can be sprayed from a second nozzle. At least one of the first adhesive component and the second activator component further has an additive that is configured to provide a visual or other identifiable indication when the first adhesive component is mixed with the second activator component.

The additive of the present invention may be in either of the adhesive or activator. In some embodiments, the additive will provide a visual indication, such as color change, any time the components are mixed. In another embodiment, the visual indication will be provided only when the components are combined in a proper ratio or within a ratio range. In many embodiments the additive is a pH indicator, however any additive that provides, for example, a visually/optically identifiable indication may be used.

DETAILED DESCRIPTION

Figure 1:
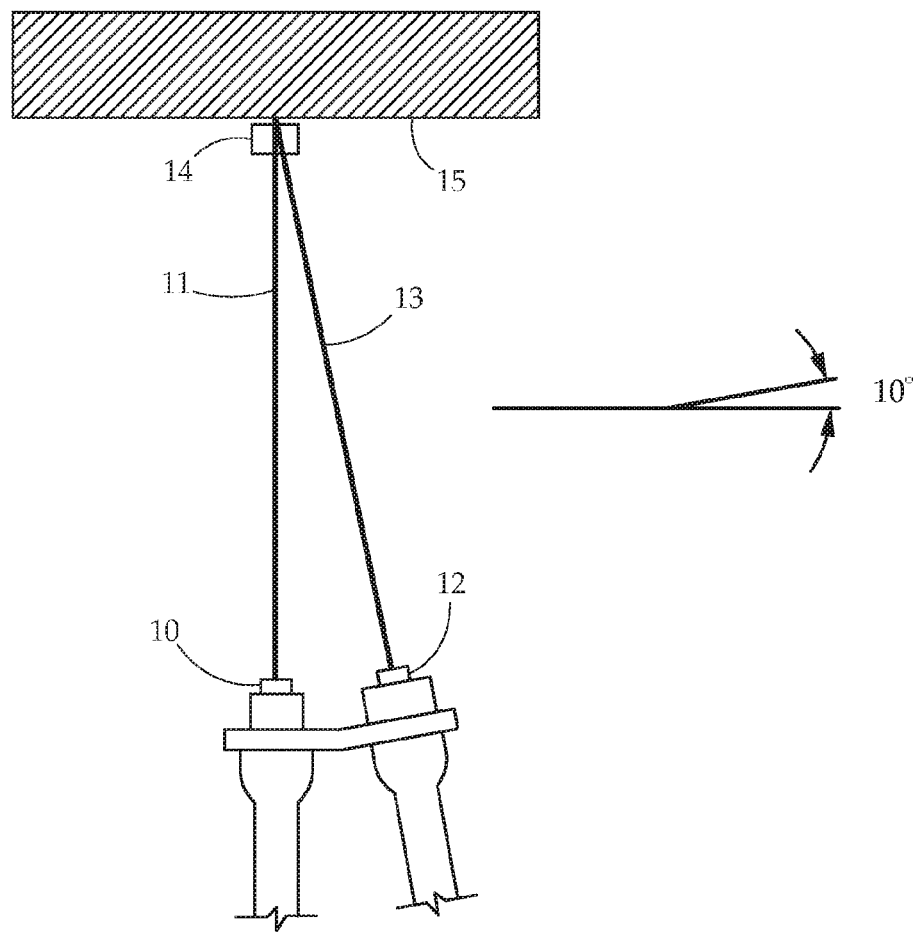
FIG. 1 provides an elevation view of an embodiment of the two component adhesive system being sprayed on a substrate.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a two component adhesive system which includes an adhesive and an activator. In use, the adhesive and activator are mixed. Upon mixing the activator destabilizes the adhesive to make it more effective. At least one of the adhesive and activator further comprises an additive. The additive provides an indication, typically a visual indication, when the two components are mixed, thereby allowing a user to know if the components are mixing as intended during application, or not. As such, the two component adhesive system provides indication that proper amounts of adhesive and activator are being sprayed onto a surface. In one embodiment, there may be a visual indication when the adhesive and activator are both present. In another embodiment, there will be a visual indication when the adhesive and activator are both present in the correct ratio. For example, in one embodiment, the correct ratio may be five parts adhesive to one part activator. This 5:1 ratio may also vary +/−20% in another embodiment.

The additive contemplated herein may be any chemical additive capable of being added to either the adhesive or activator. In one embodiment, the additive may be a pH indicator, selected to provide one color to one of the components at a first pH, and to provide another different color at a second, different pH. The changed pH occurs when the two components are combined. In one embodiment, the additive may be added to the adhesive and may be selected to provide a visual indication upon a presence of the activator. In another embodiment, the additive may be added to the activator and may be selected to provide a visual indication upon a presence of the adhesive. In another embodiment, the additive may be a foaming component that allows a user to see that the foaming is occurring, indicating mixing.

For embodiments having the pH indicator additive, in many cases, the adhesive may be alkaline, having, for example, a pH of approximately 9, while the activator may have a lower pH and specifically may be acidic. As such, the pH indicator additive may be configured to provide a color change when the pH decreases (if the pH indicator has been added to the adhesive), or a color change when the pH increases (if the pH indicator has been added to the activator). In other words, the color change may occur when the pH goes from alkaline towards neutral, or from acidic towards neutral. A lack of color change in this embodiment indicates that the adhesive and activator are not properly mixing. The result of the adhesive and activator configuration in this embodiment is that if either nozzle of the two part adhesive spray gun becomes clogged (or a source runs out, etc.), there will be no visual indication (such as color change) on the sprayed surface. This will inform a user or computerized system (using an optical or other sensor) that the activator and adhesive are not being properly mixed. The operator may then stop the spraying and inspect the system and potentially unclog one or both nozzles of the two part spray system, check and/or refill the feeds, or otherwise address the issue. It should be understood that other additives may be used to create other changes upon mixing, such as an increase or decrease in infrared radiation, Ultraviolet change, or other electromagnetic spectrum change detectable by a sensor.

The adhesive of the present invention may be any water based adhesive. Such adhesives may include adhesives with a polychloroprene latex base. In other embodiments, the adhesive may have other bases, or combinations thereof, such as styrene butadiene rubber (SBR), Acrylic, Vinyl Acetate Ethylene (VAE), Poly-Vinyl Acetate (PVA), Vinyl Acrylic, Nitrile, Styrene Acrylic, Polyisoprene, Butyl Rubber, Guayule, Natural rubber, and the like.

The activator contemplated herein may be any acid or salt solution or dispersion capable of activating the adhesive component thereby making it highly tacky and adherent. Examples of activators may include, but are not limited to: Acids such as: hydrochloric acid, phosphoric acid, sulfuric acid, nitric acid, boric acid, oxalic acid, acetic acid, citric acid, lactic acid, glycolic acid, propionic acid, glycine, alanine, valine, leucine, isoleucine, glycine; Sulfate salts such as: zinc sulfate, potassium sulfate, sodium sulfate, magnesium sulfate, calcium sulfate, ammonium sulfate; Nitrate salts such as: calcium nitrate and ammonium nitrate; Ammonium salts such as: ammonium nitrate, ammonium sulfate, ammonium chloride; Chloride salts such as: zinc chloride, potassium chloride, sodium chloride, magnesium chloride, calcium chloride, and the like. These acids and salts are generally solvated in water at varying concentrations, typically at 30% or less. More typically in the range of 2 to 15%. In another embodiment, the activator may be a dispersion of sodium silicofluoride in water, or other similar dispersion.

As noted above, in some embodiments the additive may include a pH indicator. Examples of pH indicators include, but are not limited to: Cresol Red, Bromocresol Purple, Methyl Red, Bromothymol Blue, Phenol Red, Neutral Red, Phenolphthalein, Cresolphthalein, and Congo Red, among others. These additive pH indicators may be added to either the adhesive or the activator. In many embodiments, the indicators are dissolved in water before being added to the adhesive, however this is not required. In a particular embodiment, the additive may be added to the adhesive with a concentration of 0.01%. In another embodiment, the additive may be added to the adhesive with a concentration ranging from 0.001% to 1%.

Turning now to FIG. 1, a top view of a two component spray system is provided that is spraying the two component adhesive of the present invention. This spray system may be a hand held gun, mechanically controlled spraying assembly, mounted spray nozzles, and the like. In some mechanically controlled gun embodiments, a robotic arm (hydraulic, motorized, and the like) may control movement of the spraying device. Adhesive stream 11 is airlessly sprayed from nozzle 10 (though an air atomized system may similarly provide effective spraying). Activator stream 13 is airlessly sprayed from nozzle 12 (and again an air atomized system may similarly provide effective spraying). In this embodiment, activator nozzle 12 is angled 10 degrees towards the adhesive nozzle 10. However, it should be understood that the nozzles may be at any angle, and may be parallel to each other, in varying embodiments.

It should be understood that a feed source for the adhesive 11 and activator 13 (which are stored separately) are connected to the nozzles 10, 12 through a quantity of, for example, piping or tubing. The fluids then travel through fluid flow paths within the spraying system before reaching the nozzles 10, 12. The two sprays 11, 13, may mix together at point 14 and/or on the surface of the substrate 15, and are deposited on substrate 15. Further mixing may occur on the surface of substrate 15. Using the adhesive and activator of this embodiment of the present invention, at least one of them will contain an additive to provide a visual or other measurable change when mixed. As such, the user can view the spray surface of substrate 15 and observe a visual change or indication (such as a color change, or simply look for a color known to be present during proper mixing). If this visual indication is not observed, a user or system controller can tell that a problem exists that is causing improper mixing. Such a problem may be, for example, clogged nozzle or nozzles, an empty supply source, improper sprayer calibration, and the like.

Figure 2:
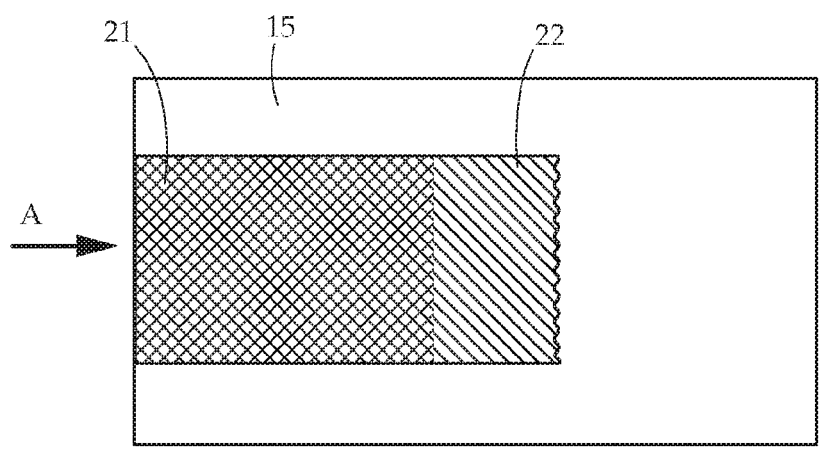
FIG. 2 provides a view of an embodiment of the two component system sprayed on a substrate when properly mixed and not mixed.

FIG. 2 provides a frontal view of a sprayed surface of a substrate showing a visual indication of both proper mixing and improper mixing of adhesive and activator. Front surface of substrate 15 is shown. This surface is being sprayed with the adhesive and activator combination in direction A, with spray moving from left to right on the page. At region 21 the spray can be seen to be indicating that mixing is proper. However, at region 22, there is no longer proper mixing as demonstrated by the lighter hashing. In other words, there is a visible difference between region 21 having mixing and region 22 having improper mixing. If a user or system observes such a visual indication, or lack thereof, spraying may cease and the problem may be addressed.

Figure 3:
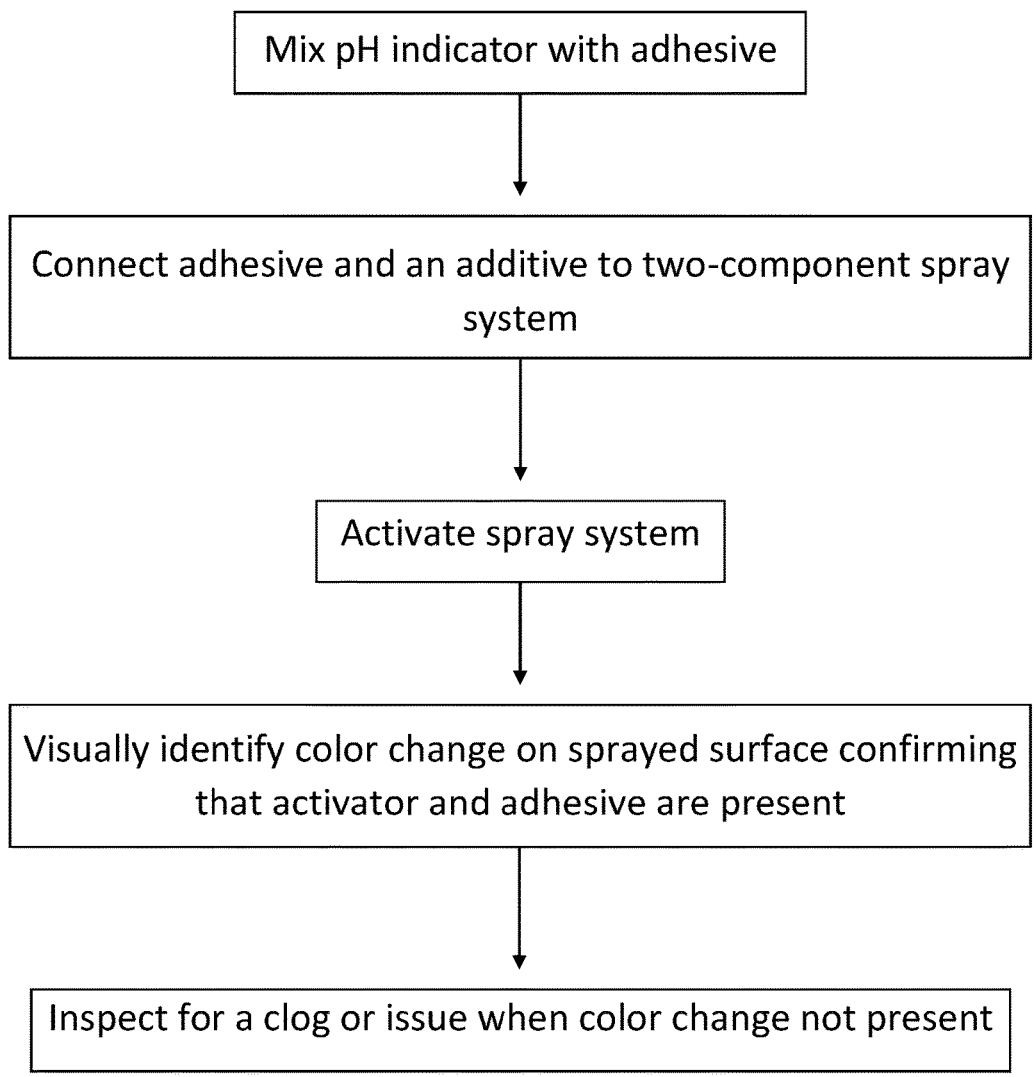
FIG. 3 provides a flow chart of an embodiment of use of the present invention.

As shown in FIG. 3, an embodiment of the present invention can be carried out in a number of steps. These steps may begin with mixing the pH indicator additive with the adhesive. It should be understood that in an alternate embodiment, the pH indicator additive may be mixed with the activator. This adhesive and additive combination may then be connected to a two part spraying system, along with an activator source. The two component spray system may be turned on, spraying both components, and this spray may be directed to a surface. A spray system operator (or computerized optical system) may identify that the spray system is operating properly, delivering both adhesive and activator, by observing and identifying the desired color change caused by the pH change during mixing of the adhesive and activator. When the color change is not present, the operator (or computerized optical system) may deactivate the spray system and inspect for an issue that the adhesive and activator are not properly mixing. This may be caused by a clog in either nozzle (more likely the activator nozzle), a clog in other parts of the spraying system, and running out of adhesive or activator, among others.

In summary, the present invention provides a visual or other detectable indication confirming the presence of both adhesive and activator in a two component adhesive spray system. This indication is achieved by providing an additive to either the adhesive or activator that is capable of providing an indication (color change, for example) when both components are present.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A two component adhesive spraying system comprising:
    a first adhesive component in fluid communication with, and sprayable from a first nozzle;
    a second activator component in fluid communication with, and sprayable from a second nozzle; and
    wherein at least one of the first adhesive component and second activator component comprises an additive providing a visual indication when the first adhesive component is mixed with the second activator component.

2. The two component adhesive spraying system of claim 1 wherein the visual indication is present when the first adhesive component is mixed with the second activator component in a correct ratio.

3. The two component adhesive spraying system of claim 1 wherein the additive is a pH indicator.

4. The two component adhesive spraying system of claim 3 wherein the first adhesive component comprises the pH indicator.

5. The two component adhesive spraying system of claim 3 wherein the second activator component comprises the pH indicator.

6. The two component adhesive spraying system of claim 3 wherein the pH indicator is at least one of Cresol Red, Bromocresol Purple, Methyl Red, Bromothymol Blue, Phenol Red, Neutral Red, Phenolphthalein, Cresolphthalein, Congo Red, and combinations thereof.

7. The two component adhesive spraying system of claim 1 further comprising a spray gun, the spray gun comprising the first nozzle and the second nozzle.

8. The two component adhesive spraying system of claim 1 further comprising a mechanized spraying system movable by a motorized structure, the mechanized spraying system comprising the first nozzle and the second nozzle.

9. The two component adhesive spraying system of claim 1 wherein the activator is at least one of an acid, a sulfate salt solution, a nitrate salt solution, an ammonium salt solution, a chloride salt solution, and a sodium silicoflouride dispersion.

10. The two component adhesive spraying system of claim 1 is a water based adhesive.

11. A sprayable adhesive formulation comprising:
    a first adhesive component;
    a second activator component mixable with the first adhesive component and configured to destabilize the first adhesive component; and
    wherein at least one of the first adhesive component and second activator component comprises an additive providing a visual indication when the first adhesive component is mixed with the second activator component.

12. The two component adhesive spraying system of claim 11 wherein the visual indication is present when the first adhesive component is mixed with the second activator component in a correct ratio.

13. The two component adhesive spraying system of claim 11 wherein the additive is a pH indicator.

14. The two component adhesive spraying system of claim 13 wherein the first adhesive component comprises the pH indicator.

15. The two component adhesive spraying system of claim 13 wherein the second activator component comprises the pH indicator.

16. The two component adhesive spraying system of claim 13 wherein the pH indicator is at least one of Cresol Red, Bromocresol Purple, Methyl Red, Bromothymol Blue, Phenol Red, Neutral Red, Phenolphthalein, Cresolphthalein, Congo Red, and combinations thereof.

17. The two component adhesive spraying system of claim 11 wherein the activator is at least one of an acid, a sulfate salt solution, a nitrate salt solution, an ammonium salt solution, a chloride salt solution, and a sodium silicoflouride dispersion.

18. The two component adhesive spraying system of claim 11 is a water based adhesive.

19. The two component adhesive spraying system of claim 13 wherein the pH indicator is selected to provide a color change upon a decrease of the pH.

20. The two component adhesive spraying system of claim 13 wherein the pH indicator is selected to provide a color change upon an increase of the pH.

\* \* \* \* \*